(12) United States Patent
Cai et al.

(10) Patent No.: US 10,711,734 B2
(45) Date of Patent: *Jul. 14, 2020

(54) OPTIMAL THRUST CONTROL OF AN AIRCRAFT ENGINE

(71) Applicant: UNITED TECHNOLOGIES CORPORATION, Farmington, CT (US)

(72) Inventors: Chaohong Cai, Weatogue, CT (US); Timothy J. Crowley, Tolland, CT (US); Mark E. Lacour, Glastonbury, CT (US); David Lei Ma, Avon, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/377,488

(22) Filed: Apr. 8, 2019

(65) Prior Publication Data

US 2020/0025130 A1    Jan. 23, 2020

Related U.S. Application Data

(63) Continuation of application No. 14/921,019, filed on Oct. 23, 2015, now Pat. No. 10,253,725.

(Continued)

(51) Int. Cl.
*F02K 1/17* (2006.01)
*F02C 9/50* (2006.01)
(Continued)

(52) U.S. Cl.
CPC ............... *F02K 1/17* (2013.01); *F02C 9/00* (2013.01); *F02C 9/50* (2013.01); *F02C 9/54* (2013.01);
(Continued)

(58) Field of Classification Search
CPC ...... F02K 1/17; F02C 9/00; F02C 9/50; F02C 9/54; F05D 2270/20; F05D 2270/44; F05D 2270/71
(Continued)

(56) References Cited

U.S. PATENT DOCUMENTS

| 4,947,643 A | 8/1990 | Pollak et al. |
| 5,447,023 A * | 9/1995 | Meisner .................... F02C 9/28 60/39.26 |

(Continued)

OTHER PUBLICATIONS

European Search Report for Application No. 15194807.2-1607; dated Apr. 19, 2016; 7 pgs.

*Primary Examiner* — Marthe Y Marc-Coleman
(74) *Attorney, Agent, or Firm* — Cantor Colburn LLP

(57) ABSTRACT

A control system for a gas turbine engine, a method for controlling a gas turbine engine, and a gas turbine engine are disclosed. The control system may include a nozzle scheduler for determining an exhaust nozzle position goal based on a nozzle schedule of exhaust nozzle positions related to flight conditions. The control system may further include a control module for determining a control command for the gas turbine engine. The control command may include, at least, a fuel flow command and an exhaust nozzle position command and the control command may be based on, at least, the exhaust nozzle position goal and an estimated thrust value. The control system may further include an actuator for controlling the gas turbine engine based on the control command.

20 Claims, 5 Drawing Sheets

Related U.S. Application Data

(60) Provisional application No. 62/079,611, filed on Nov. 14, 2014.

(51) Int. Cl.
*F02C 9/54* (2006.01)
*F02C 9/00* (2006.01)

(52) U.S. Cl.
CPC ...... *F05D 2270/20* (2013.01); *F05D 2270/44* (2013.01); *F05D 2270/71* (2013.01)

(58) Field of Classification Search
USPC .......................................................... 701/100
See application file for complete search history.

(56) References Cited

U.S. PATENT DOCUMENTS

| | | | |
|---|---|---|---|
| 6,269,627 B1 * | 8/2001 | Freese | F02C 3/10 |
| | | | 244/12.3 |
| 8,682,454 B2 | 3/2014 | Fuller et al. | |
| 2009/0306866 A1 | 12/2009 | Malikopoulos | |
| 2010/0063790 A1 | 3/2010 | Truscott et al. | |
| 2012/0221156 A1 | 8/2012 | Fuller et al. | |
| 2013/0158680 A1 | 6/2013 | Fuller | |
| 2014/0005910 A1 | 1/2014 | Teicholz et al. | |
| 2015/0159499 A1 * | 6/2015 | Bacic | F01D 11/14 |
| | | | 415/1 |
| 2016/0138523 A1 | 5/2016 | Cai et al. | |

\* cited by examiner

OPTIMAL THRUST CONTROL OF AN AIRCRAFT ENGINE

CROSS-REFERENCE TO RELATED APPLICATIONS

This application is a continuation application which claims priority to U.S. Non-Provisional patent application Ser. No. 14/921,019 filed on Oct. 23, 2015, which claimed priority to U.S. Provisional Patent Application Ser. No. 62/079,611 filed on Nov. 14, 2014, each of which is incorporated herein by reference in its entirety.

BACKGROUND OF THE DISCLOSURE

The present disclosure relates to gas turbine engines, and more particularly, to control systems for gas turbine engines.

Modern aircrafts employing gas turbine engines require high performance engine control systems that deliver enhanced performance and reduced lifecycle cost. Control systems may be optimized by using engine control algorithms that achieve multiple economical and operational objectives. Such control systems are desired for extending engine life, reducing fuel consumption, and enhancing dynamic performance in thrust and power delivery.

For example, prior engine control systems may have aimed to optimize fuel consumption only by attempting to provide a goal thrust response while minimizing fuel consumption for the goal thrust response. However, such approaches to engine control must often manage competing operability and performance objectives by resetting engine exhaust nozzles using transient schedules that are developed off-line from extensive simulations and tests. Such control systems may not optimize all available effectors to achieve a set of performance and operability goals and constraints. Further, these control designs may not fully utilize engine characteristics and dynamic models to optimize (in real-time) engine performance while protecting engine state limits.

Modeling engine characteristics of an aircraft engine, directly or indirectly, may be useful for monitoring and controlling thrust for the engine. The thermal characteristics of the engine can be synthesized or calculated using sensed parameters. Further, thermal characteristics may be estimated by linear or non-linear models of engine components and the components' respective characteristics. Such characteristics may provide information used to determine and/or optimize thrust control commands in running real-time optimization algorithms. Such parameters may be monitored and/or controlled using a control system having a variety of hardware and/or software control elements.

Thusly, a need exists for control systems that control and optimize thrust control of an aircraft engine by real-time coordinating engine effectors that may include fuel flow, exhaust nozzles and variable geometry, thereby achieving optimal performance and operability goals and optimizing engine life, fuel consumption, and dynamic performance.

SUMMARY OF THE DISCLOSURE

In accordance with one aspect of the disclosure, a control system for a gas turbine engine is disclosed. The control system may include a nozzle scheduler for determining an exhaust nozzle position goal based on a nozzle schedule of exhaust nozzle positions related to flight conditions. The control system may include system sensors for determining sensor signals and an engine model for estimating synthesis signals using the sensor signals. The control system may further include a control module for determining a control command for the gas turbine engine. The control command may include, at least, a fuel flow command and an exhaust nozzle position command and the control command may be based on, at least, the exhaust nozzle position goal and the synthesis signals. The control system may further include an actuator for controlling the gas turbine engine based on the control command.

In a refinement, the control system may further include a command shaper for determining an engine thrust goal based on, at least, a throttle level angle command.

In a further refinement, the control command is further based on the engine thrust goal.

In a refinement, the one or more off-line simulations of the gas turbine engine include, at least, a steady-state simulation on a high-fidelity engine aero-thermal model.

In a refinement, the nozzle schedule may be determined from one or more off-line simulations of a cycle of the gas turbine engine.

In a further refinement, the one or more off-line simulations of the gas turbine engine include, at least, a transient simulation on a high-fidelity engine aero-thermal model.

In a further refinement, the sensor signals include at least one of a speed signal a pressure signal, or a temperature signal.

In a refinement, the control command includes at least one of a stator vane position command or a bleed position command.

In a refinement, the control module includes a state variable model of the gas turbine engine for determining the multi-variable control command.

In a further refinement, the control module includes an optimization formulation, the optimization formulation receiving input from, at least, the state variable model to determine constrained optimization problem data.

In another further refinement, the control module includes an optimization solver, the optimization solver receiving input of the constrained optimization problem data from the optimization formulation to determine the multivariable control command.

In accordance with another aspect of the disclosure, a method for controlling a gas turbine engine is disclosed. The gas turbine engine includes, at least, an exhaust nozzle. The method may include determining a nozzle schedule of exhaust nozzle positions related to flight conditions. The method may further include determining an exhaust nozzle position goal based on the nozzle schedule and determining sensor signals using system sensors. The method may further include estimating synthesis signals using an engine model and input from the sensor signals. The method may further include determining a control command for the gas turbine engine wherein the control command is based on, at least, the exhaust nozzle position goal and the synthesis signals. The method may further include controlling the gas turbine engine based on the control command by using an actuator.

In a refinement, the method may further include determining an engine thrust goal based on, at least, a throttle level angle command.

In a further refinement, the control command is further based on the engine thrust goal.

In a refinement, the one or more off-line simulations of the gas turbine engine may include at least one of a transient simulation based on a high-fidelity engine aero-thermal model or a steady-state simulation based on a high-fidelity engine aero-thermal model.

In accordance with another aspect of the disclosure, a gas turbine engine is disclosed. The gas turbine engine may include a compressor section, a combustor section downstream of the compressor section, a turbine section downstream of the combustor section, and an exhaust nozzle. The gas turbine engine may further include a control system. The control system may include a nozzle scheduler for determining an exhaust nozzle position goal based on a nozzle schedule of exhaust nozzle positions related to flight conditions. The control system may include system sensors for determining sensor signals and an engine model for estimating synthesis signals using the sensor signals. The control system may further include a control module for determining a control command for the gas turbine engine. The control command may be based on, at least, the exhaust nozzle position goal and the synthesis signals. The control system may further include an actuator for controlling the gas turbine engine based on the control command.

In a refinement, the actuator controls positioning of the exhaust nozzle based on the control command.

In a refinement, the control system further includes a command shaper for determining an engine thrust goal based on, at least, a throttle level angle command.

In a further refinement, the control command further based on the engine thrust goal.

In a refinement, the actuator controls a fuel flow to the combustor section based on the control command.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE DISCLOSURE

Figure 1:
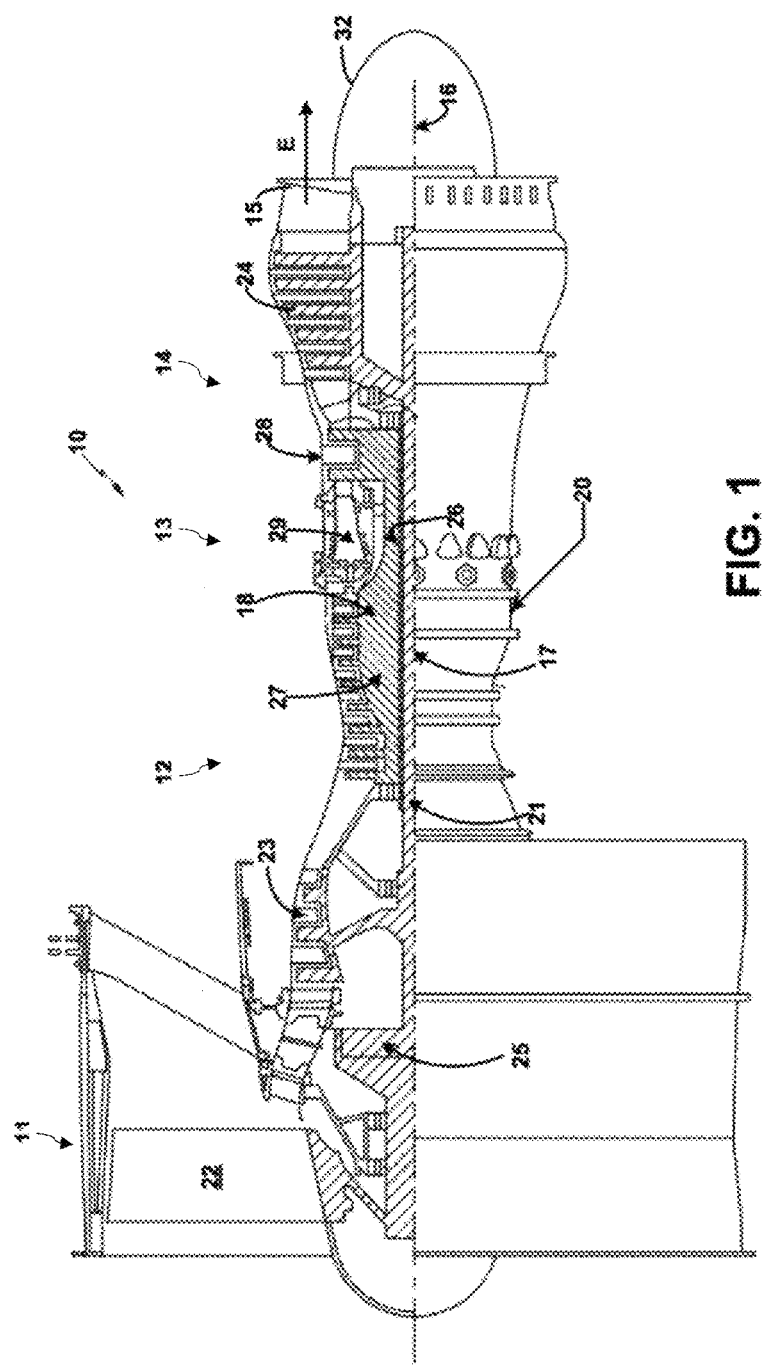
FIG. 1 is a cross-sectional view of a gas turbine engine constructed in accordance with the present disclosure.

Referring to the drawings, and with specific reference to FIG. 1, a gas turbine engine constructed in accordance with the present disclosure is generally referred to by reference numeral 10. Such a gas turbine engine 10 can be used for any number of different applications including, but not limited to, generation of aircraft thrust, rotorcraft power and land-based power. Moreover, it is to be understood that the sectional view provided in FIG. 1 is included simply to provide a basic understanding of the various sections in a gas turbine engine, and not to limit the invention thereto. The present disclosure extends to all types of gas turbine engines used in all types of applications.

The gas turbine engine 10 may have a fan section 11, the fan section 11 drawing in ambient air and directing the ambient air to a compressor section 12. The incoming air is greatly compressed by the compressor section 12 and directed to a combustor section 13 where it is mixed with fuel and combusted. The products of that combustion, in the form of very hot and expanding gases, are directed to a turbine section 14 shown to be downstream of the combustor section 13. The turbine section 14 and/or compressor section 12 may be comprised of a plurality of blades radially extending from a shaft forming rotating sections or rotors. A plurality of vanes may radially extend inwardly from a static section or stator, and are intermeshed with the plurality of blades. In so doing, it can be seen that the turbine section 14, compressor section 12, combustor section 13, fan section 11, and nozzle section 15 all revolve around a central engine axis 16.

The gas turbine engine 10 may include an exhaust section 15 that may be include a plurality of variable exhaust nozzles or any type of convergent-divergent nozzles. The nozzles may play an important role in regulating pressure thrust to the engine for purpose of optimizing engine performance and operations.

As mentioned above, the compressor section 12 may include a plurality of blades radially extending from a shaft forming rotating sections, or rotors, and a plurality of stator vanes may radially extend inwardly from a stator section of the compressor section 12. Some stator vanes may be variable stator vanes having a controllable angle-of-attack which may be adjusted by actuators associated with an engine control system. The compressor section 12 may also include stability bleed valves between the compressors.

Further, the gas turbine engine 10 may include a low spool 17 and a high spool 18 mounted for rotation about the central engine axis 16 relative to an engine case structure 20. The low spool 17 may include an inner shaft 21 that interconnects to a fan 22, a low pressure compressor 23 ("LPC") and a low pressure turbine 24 ("LPT"). The inner shaft 21 may drive the fan 22 directly or through a geared architecture 25 to drive the fan at a lower speed than the low spool 17. The high spool 18 may include an outer shaft 26 that interconnects a high pressure compressor 27 ("HPC") and high pressure turbine ("HPT") 28. A combustor 29 is arranged between the HPC 27 and the HPT 28. The inner shaft 21 and the outer shaft 26 may be concentric and rotate about the central engine axis 16 which is collinear with their respective longitudinal axes.

Air within the gas turbine engine 10 may be compressed by the LPC 23 and/or the HPC 27. Said air may then be mixed with fuel and burned within the combustor 29 and then may be expanded throughout the HPT 28 and/or the LPT 24. The LPT 24 and/or the HPT 28 may rotationally drive the low spool 17 and the high spool 18, respectively, in response to the expansion of the fuel/air mixture.

Upon exiting the LPT 24, exhaust flow E may be released from the gas turbine engine 10 via the exhaust section 15. The exhaust section may act as an orifice for the flow of gasses as they emerge from the engine. The size of the exhaust section 15, as an orifice, may determine the velocity of gases as they emerge from the gas turbine engine 10. To control the exhaust flow E, the exhaust section 15 may include one or more exhaust nozzles for changing the dimensions of the exhaust section 15 with respect to a tailcone 32. The exhaust section 15 may include a variable area nozzle which may be opened or closed based on the fuel flow to further optimize thrust control of the gas turbine engine 10.

Fuel flow to the combustor 29 may be configured for optimization of thrust control for the gas turbine engine 10.

Further, control of one or more exhaust nozzles in the exhaust section 15 of the gas turbine engine 10 may be employed for thrust control optimization. To achieve multiple performance objectives (e.g., reducing fuel consumption while enhancing dynamic performance of the engine), control systems and methods that determine parameters for fuel flow and nozzle schedules may be utilized, as detailed below.

Figure 2:
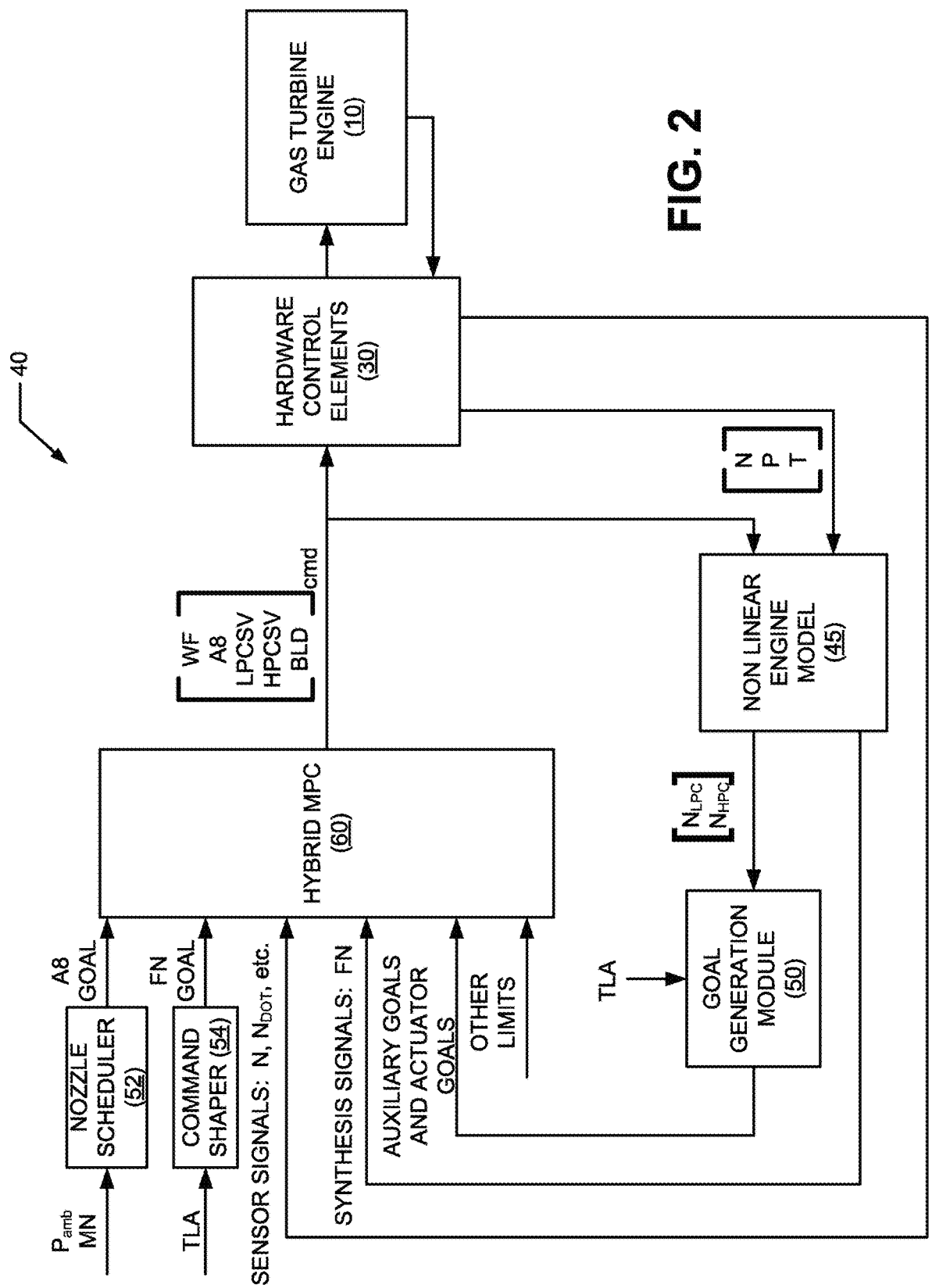
FIG. 2 is a block diagram of an exemplary control system for a gas turbine engine.

A control system 40, as shown in FIG. 2, may be employed to monitor engine conditions and control the gas turbine engine 10 for optimal thrust control. The control system may employ hardware control elements 30 (e.g., the system sensors 36 of FIG. 4, described below) for determining sensor signals associated with the gas turbine engine 10. The sensor signals may include sensed engine state variables such as, but not limited to, a speed associated with a component of the gas turbine engine (e.g., a spool speed N), a pressure associated with an environment of the gas turbine engine (P), and/or a temperature of a component of a gas turbine engine (T). For example, the sensed signals may include compressor spool speeds, pressure ratios associated with volumes of the compressor section 12, and/or surface temperatures of the compressor section 12.

The sensed signals may be received and processed by a non-linear engine model 45. The non-linear engine model 45 may contain aero-thermal representations, or component modules, of components of the gas turbine engine 10. The component modules within the non-linear engine model 45 may operate according to the system's constraints related to mathematical abstractions of physical laws that govern behavior of the gas turbine engine 10 (i.e., laws of conservation of energy, conservation of mass, conservation of momentum, Newton's 2nd law for rotating systems, and/or any additional known calculable physics model). The system constraints for each contained module within the non-linear engine model 45 may have specific constraints programmed within to simulate a monitored area and/or function of the gas turbine engine 10 (i.e., a bypass duct bleeds module, an exhaust nozzle module, a low spool compressor module, a high spool compressor module, etc.).

The non-linear engine model 45 may use input vectors along with internal solver states, representing on-board corrector states, solver states, and physics states, while functioning. For example, the non-linear engine model may receive sensed signals and/or may receive prior state commands from internal processing and/or from a hybrid model predictive control (HMPC) module 60. The solver states may be introduced to address fast dynamics, resolve algebraic loops, and smooth highly non-linear model elements. The non-linear engine model 45 may utilize a sensor fusion technique (e.g. a Kalman filter algorithm, an unbiased estimation algorithm, etc.) for improving engine state estimation accuracy.

After a pass for the current state, the non-linear engine model 45 may process input data and determine synthesis signals for use by the HMPC module 60. Synthesis signals may include an estimated thrust (FN) of the gas turbine engine 10, among other signals. Synthesis signals may also include engine state estimation signals that are needed for the HMPC module 60 in the processes of dynamic model prediction and constrained optimization problem formulation. The non-linear engine model 45 may also determine corrected speed signals associated with the gas turbine engine 10 using the input data. Corrected speed signals may include, but are not limited to including a corrected spool speed of the LPC 23 (NLPc) and/or a corrected spool speed of the HPC 27 (NHPc). For a definition of corrected speed and flow, see, for example, "Gas Turbine Parameter Corrections", A. J. Volponi, ASME 98-GT-947.

The corrected speed signals may be input to a goal generation module 50. To aid in optimal thrust control of the gas turbine engine 10, the corrected speed signals and the throttle level angle (TLA) may be used by the goal generation module 50 to determine actuator goals and other auxiliary goals for use by the HMPC module 60. The actuator goals may be desired positions for compressor vanes and/or stability bleeds. The auxiliary goals may be desired engine states related to engine thrust (for example, air flow at an engine station) during engine transient operations. The goal generation module 50 may utilize other data aside from the corrected speed signals to determine actuator goals.

The control system 40 further includes a nozzle scheduler 52 for determining exhaust nozzle position goals (A8 GOAL) for input to the HMPC module 60. The exhaust nozzle scheduler 52 may determine an optimal position for an exhaust nozzle of the gas turbine engine 10 (e.g., an A8 exhaust nozzle) using predetermined position goals (e.g., a nozzle schedule), which may be calculated off-line. For example, goals for exhaust nozzle position can be stored in a look-up table or a static function map. The nozzle scheduler 52 may relate predetermined exhaust nozzle positions to minimum burner pressures for specific flight conditions (e.g., take off, engine idle, engine cruise, etc.). The exhaust nozzle position goals determined for the nozzle scheduler 52 may be configured to minimize specific fuel consumption (SFC) while meeting close-loop bandwidth and/or robustness requirements that occur under small throttle perturbations. In some examples, data used by the nozzle scheduler 52 may be derived from an off-line procedure of extensive steady-state and/or transient simulations by a high-fidelity aero-thermal model of an aircraft engine.

The nozzle schedule (A8 GOAL) may be determined from a look-up table or static function map of one or more values, which may include, but are not limited to including, an ambient pressure of the environment around the aircraft (Pamb), a Mach number of the aircraft (MN), and a pressure at another station of the engine (P2). The nozzle schedule (A8 GOAL) may be determined by combining a determined nozzle position at the pressure when an engine model is at a steady state (A8_Pbmin) with an incremental nozzle position bias (A8_bias), as shown in the equation below:

$$A8\ GOAL = A8\_Pb\min + A8\_\text{bias}$$

The A8_bias denotes incremental nozzle position bias for meeting the closed-loop bandwidth and stability robustness under small throttle perturbations. In other words, A8_bias is a change in value selected from, for example, the exhaust nozzle scheduler to denote the change in nozzle position from the steady state A8_Pbmin.

Further, the control system 40 may include a command shaper 54 for determining thrust goals (FN GOAL) based on operator input (e.g., control commands given by an operator of the aircraft). The example command shaper 54 of FIG. 2 receives throttle level angle (TLA) commands and uses the TLA commands to determine a thrust goal value based on the TLA. The thrust goal value may be used as input to the HMPC 60. The command shaper may process the TLA commands through a low-pass filter (for example, a first order lag filter) when processing the information received.

Figure 3:
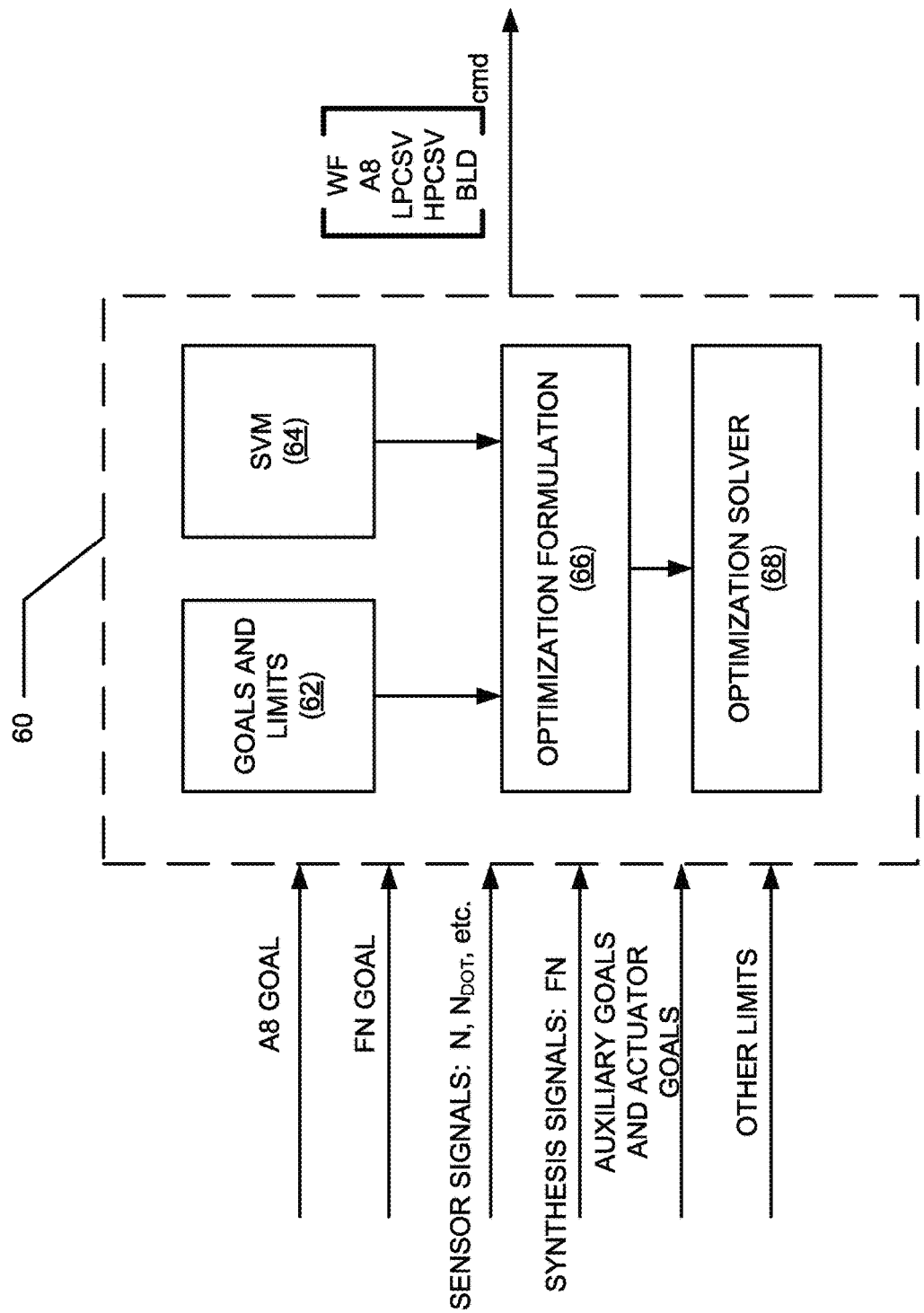
FIG. 3 is a block diagram of an exemplary hybrid model predictive control (HMPC) module of the control system of FIG. 2.

Turning now to FIG. 3, an example of the HMPC module 60 of FIG. 3 is shown. The HMPC module 60 may be a computer implemented control law for controlling and predicting behavior of the gas turbine engine 10 in real time. As a multivariable control law, the HMPC 60 is capable of decoupling responses of naturally cross coupled systems where effector changes simultaneously affect performance goals. Effector changes are means for adjusting or manipulating control variables, such as a thrust value, a power value, a nozzle position, a bleed position, a vane position, and the like.

More specifically, a hybrid model predictive control (HMPC) module 60 determines the current effector requests and makes a second model match the desired output in one next time step. The HMPC module 60 may presume that the dynamics of the gas turbine engine 10 are controlled and the desired outputs are known in the form of analytical models. The HMPC module 60 may govern control law using input from the nozzle scheduler 52, such as, but not limited to, the exhaust nozzle goal (A8 GOAL). Further, the HMPC module 60 may also govern the control law using input from the command shaper 54, such as, but not limited to, the thrust goal (FN GOAL). An objective of the HMPC module 60 is to deliver optimal thrust without violating engine operational constraints.

The control law executed by the HMPC module 60 may be generally based on a linear model, such as the state variable model (SVM) 64. The SVM 64 may be implemented within the HMPC 60 to make various predictions concerning the current iteration of the control processing and requests. The SVM 64 may use any inputs of the HMPC 60 and may utilize a model prediction horizon of a single step or multiple steps in processing dynamic model data. Output of the SVM 64 may be analyzed with the goals and limits 62 processed by and/or input to the HMPC 60 using an optimization formulation 66. Output of the optimization formulation 66 may be constrained optimization problem data for which optimization software will be able to solve, as a numerically iterative process, in real-time. The optimization solver 68 may receive constrained optimization data from the optimization formulation 66 in order to generate a multi-variable control command. For the case of a single-step model prediction control approach, an example of real-time control logic for the optimization formulation 66 and optimization solver 68 in the HMPC 60 which may be implemented is illustrated in U.S. patent application Ser. No. 13/036,914, which is hereby incorporated by reference. For the case of a multi-step model prediction control approach, an example of real-time control logic for the optimization formulation 66 and optimization solver 68 in the HMPC 60 which may be implemented is illustrated in U.S. patent application Ser. No. 13/331,844, which is hereby incorporated by reference. All of the goals and limits may be resolved in finding feasible solutions by changing optimization costs, prioritizing goals, or softening limits for purpose of real-time implementations. For example, an auxiliary goal like an inlet air flow goal from the goal generation module 50 may overcome or overwrite the A8 goal from the nozzle scheduler 52 during engine transient operations.

After computations for the current pass are complete, the HMPC 60 will output a control command to the hardware control elements 30 for use in controlling the gas turbine engine 10 for optimal thrust control. The control commands may include instructions received by actuators to control components of the gas turbine engine 10. Such control commands may include instructions for positioning a stator vane of the LPC 23 (LPCSV), instructions for positioning a stator vane of the HPC 27 (HPCSV), instructions for positioning a bleed of the engine 10 (BLD), such as a stability bleed, and/or instructions for positioning an exhaust nozzle (A8). The command instructions may also include a fuel flow rate (WF) to control fuel flow of the gas turbine engine 10 to achieve thrust goals.

Figure 4:
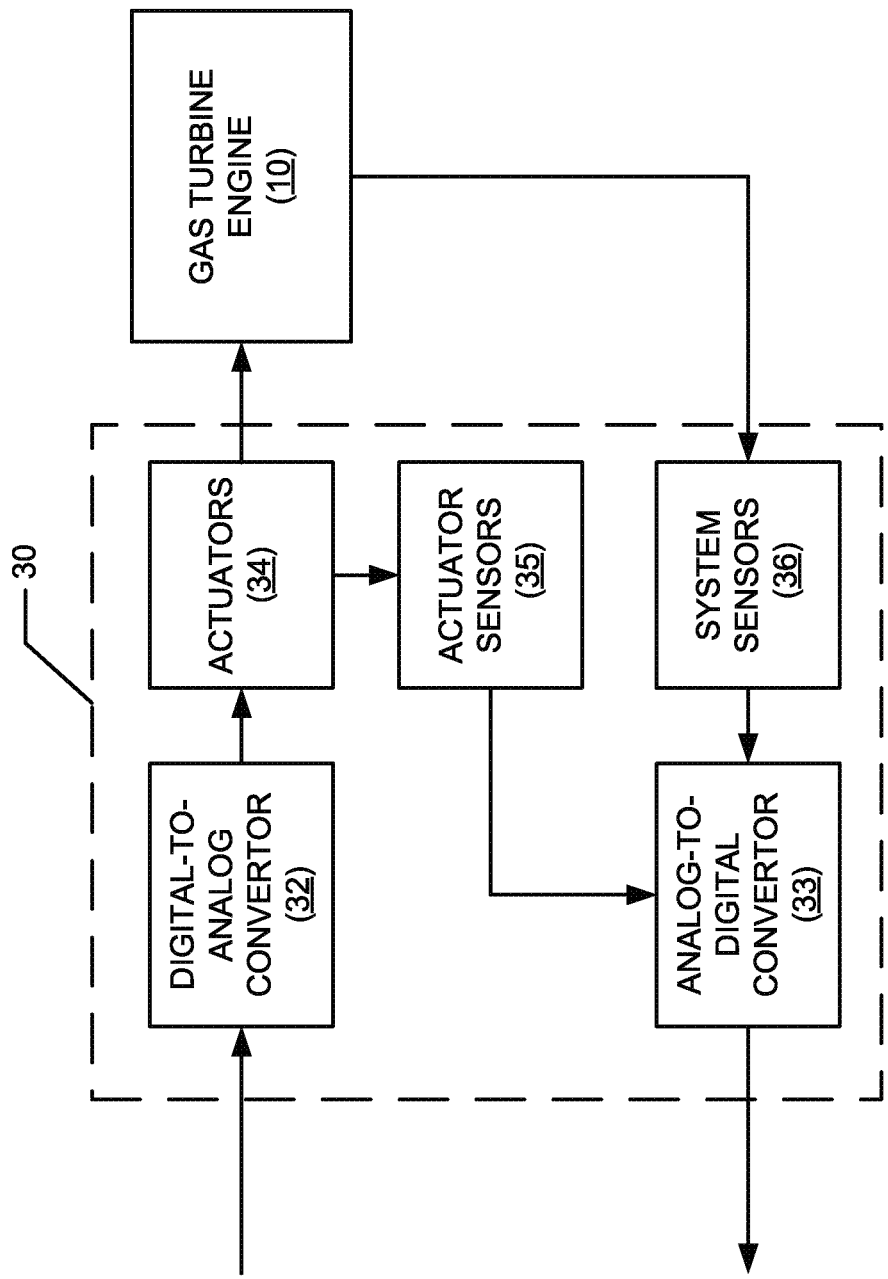
FIG. 4 is a block diagram of exemplary hardware control elements of the control system of FIG. 2.

Referring now to FIG. 4 and with continued reference to FIG. 2, hardware control elements 30 are shown. The hardware control elements 30 may convert digital data generated by the HMPC 60 to an analog form readable by the gas turbine engine 10 (e.g., electrical signals), convert analog data generated by the gas turbine engine 10 into digital data readable by other elements of the control system 40, condition such input and output data for readability, and/or control actuators 34 associated with the gas turbine engine 10.

The digital-to-analog convertor 32 can transform digital signals generated by the HMPC 60 into actuator requests. The actuators 34 may be one or more devices which use control hardware to position various control components of the apparatus 10 in accordance with instructions generated by the HMPC 60. Actuators, such as the actuators 34, may be designed to provide quick and accurate control of an apparatus.

Actuator sensors 35 may be included to measure various states of the actuators 34, wherein the actuator states (or positions) may be related to the physical configuration of the various control components of the apparatus 10. For example, fluid-based systems often include actuators whose linear or angular positions are sensed by actuator sensors 34, and which are related to the physical position of control surfaces or other control devices located proximate to a compressor, combustor, turbine and/or nozzle/exhaust assembly.

Further, the hardware control components 30 may include apparatus system sensors 36. The apparatus system sensors 36 may measure operational parameters associated with the apparatus 10. For example, fluid-based systems may include apparatus system sensors 36 that measure the working fluid pressure, temperature and fluid flow at various axial and radial locations in the flow path. Apparatus system sensors 36 may comprise a variety of different sensing devices, including, but not limited to, temperature sensors, flow sensors, vibration sensors, debris sensors, current sensors, voltage sensors, level sensors, altitude sensors and/or blade tip sensors. Apparatus system sensors 36 may be positioned to measure operational parameters related to the function of the gas turbine engine 10, e.g., parameters related to control commands submitted to HMPC 60 and control requests generated by HMPC 60 in order to direct actuators 34 to control the gas turbine engine 10.

Both the apparatus system sensors 36 and the actuator sensors 35 may produce electrical signals based upon a read-out result from said sensors. The electrical signals produced by the actuator sensors 35 and the apparatus system sensors 36 may be transmitted to an analog-to-digital convertor 33. The analog-to-digital convertor 33 may convert the electrical signals into digital signal data which may be compatible with and read by downstream modules of the control system 40. The analog to digital convertor 33 may output sensor signals to the non-linear engine model 45 and/or the HMPC module 60.

One or more elements, processes, and/or devices illustrated in FIGS. 2-4 may be combined, divided, rearranged, omitted, eliminated and/or implemented in any other way. Further, the example elements of FIGS. 2-4 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example elements are hereby expressly defined to include a tangible computer readable medium storing the software and/or firmware. Further still, the example embodiments that have been illustrated may include one or more elements, processes and/or devices in addition to, or instead of, those illustrated in FIGS. 2-4, and/or may include more than one of any or all of the illustrated elements, processes and devices.

Figure 5:
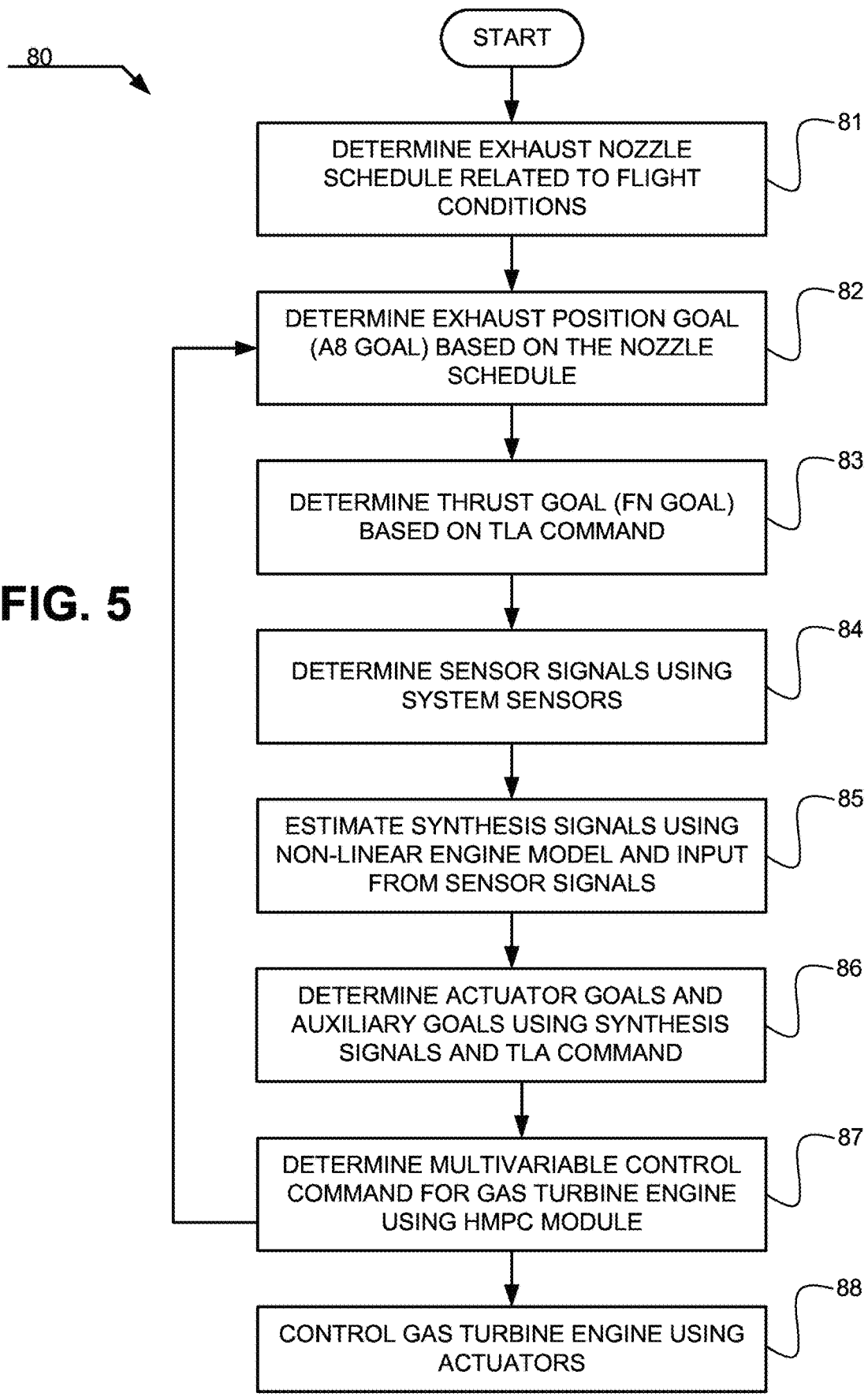
FIG. 5 is a flowchart for an exemplary method for controlling a gas turbine engine with optimal thrust control.

Turning now to FIG. 5, a flowchart representing a method 80 for controlling the gas turbine engine 10 for optimal thrust performance is shown. The method begins at block 81 wherein, for example, a nozzle schedule of exhaust nozzle positions, as related to flight conditions, is determined using one or more off-line simulations of a cycle of the gas turbine engine 10. The off-line simulations may include, but are not limited to including, steady-state and/or transient simulations on a high-fidelity engine aero-thermal model.

At block 82, an exhaust nozzle position goal (A8 GOAL) is determined based on the nozzle position values of the nozzle scheduler 52. In some examples, the method 80 may include determining a thrust goal (FN GOAL) based on a received throttle level angle (TLA) command using the command shaper 54 (block 83). Further, sensor signals may be determined using the system sensors 36 (block 84). Using, at least, the sensor signals, the non-linear engine model 45 may determine synthesis signals, the synthesis signals including, at least, an estimated thrust value for the gas turbine engine 10 (block 85). In some examples, the method may include determining actuator goals and auxiliary goals using the synthesis signals and/or the TLA command (block 86).

At block 87, the HMPC module 60 receives, at least, the exhaust nozzle position goal and the synthesis signals and produces a multivariable control command for the gas turbine engine 10 based on, at least, the exhaust nozzle position goal and the synthesis signals. The multi-variable control command includes, at least, a fuel flow command and an exhaust nozzle position command. The actuators 34 may then control the gas turbine engine 10 based on the multi-variable control command (block 88).

INDUSTRIAL APPLICABILITY

From the foregoing, it can be seen that the technology disclosed herein has industrial applicability in a variety of settings such as, but not limited to, control systems for a gas turbine engine. The gas turbine engine may be used in conjunction with an aircraft for generating thrust, a rotorcraft for generating power or torque, or for land-based applications for generating power. The teachings of the present disclosure may be useful for optimizing the thrust control of a gas turbine engine. Further, the systems and methods of the present disclosure may be useful in minimizing the specific fuel consumption of a gas turbine engine over the entire flight envelope. Additionally, the control system of the present disclosure may provide faster response to user commands and smoother transient performance for the user. The technology disclosed herein may allow a gas turbine engine to operate at a more efficient level, without sacrificing engine performance, due to optimization of engine thrust.

While the present disclosure has been in reference to a gas turbine engine and an aircraft, one skilled in the art will understand that the teachings herein can be used in other applications as well. It is therefore intended that the scope of the invention not be limited by the embodiments presented herein as the best mode for carrying out the invention, but that the invention will include all equivalents falling within the scope of the claims as well.

What is claimed is:

1. A control system for a gas turbine engine, the control system comprising:
    a nozzle scheduler for determining an exhaust nozzle position goal (A8 GOAL) based on a nozzle schedule of exhaust nozzle positions related to flight conditions, the exhaust nozzle changing positions to change dimensions of an exhaust section with respect to a tail cone;
    a plurality of system sensors for determining sensor signals;
    an engine model for estimating synthesis signals (FN) using the sensor signals;
    a goal generator module for determining auxiliary goals and actuator goals;
    the auxiliary goals based on engine states that are related to engine thrust during transient engine operations; and
    the actuator goals based on positions for high pressure compressor stator vanes (HPCSV), low pressure compressor stator vanes (LPCSV) and/or engine stability bleeds (BLD);
    a control module, being a hybrid model predictive control (HMPC), electronically receiving information, including:
    the exhaust nozzle position goal (A8 GOAL);
    the sensor signals;
    the synthesis signals (FN); and
    the auxiliary and actuator goals; and
    based on the received information, the control module determining and outputting a control command for the gas turbine engine, the control command including:
    a fuel flow (WF) command;
    a stability bleeds (BLD) position command;
    an exhaust nozzle position command;
    a high pressure compressor stator vanes (HPCSV) position command; and
    a low pressure compressor stator vanes (LPCSV) position command.

2. The control system of claim 1, further comprising:
    at least an actuator for controlling the gas turbine engine based on the control command, including controlling:
    the fuel flow (WF);
    the stability bleeds (BLD) position;
    the exhaust nozzle position;
    the high pressure compressor stator vanes (HPCSV) position; and
    the low pressure compressor stator vanes (LPCSV) position.

3. The control system of claim 2, further comprising a command shaper for determining an engine thrust goal (FN GOAL) based on, at least, a throttle level angle (TLA) command.

4. The control system of claim 3, wherein the control command is further based on the engine thrust goal (FN GOAL).

5. The control system of claim 2, wherein the nozzle schedule is determined from one or more off-line simulations of a cycle of the gas turbine engine.

6. The control system of claim 5, wherein the one or more off-line simulations of the gas turbine engine include, at least, a steady-state simulation on a high-fidelity engine aero-thermal model.

7. The control system of claim 5, wherein the one or more off-line simulations of the gas turbine engine include, at least, a transient simulation on a high-fidelity engine aero-thermal model.

8. The control system of claim 2, wherein the sensor signals include at least one of a speed signal, a pressure signal, or a temperature signal.

9. The control system of claim 8, wherein the control module includes an optimization solver, the optimization solver receiving input of the constrained optimization problem data from the optimization formulation to determine the control command.

10. The control system of claim 2, wherein the control module includes a state variable model of the gas turbine engine for determining the control command.

11. The control system of claim 10, wherein the control module includes an optimization formulation, the optimization formulation receiving input from, at least, the state variable model to determine constrained optimization problem data.

12. A method for controlling a gas turbine engine, the gas turbine engine including, at least, an exhaust nozzle, the exhaust nozzle changing positions to change dimensions of an exhaust section with respect to a tail cone, the method comprising:
determining a nozzle schedule of exhaust nozzle positions related to flight conditions;
determining an exhaust nozzle position goal (A8 GOAL) based on the nozzle schedule;
determining sensor signals using system sensors;
estimating synthesis signals (FN) using an engine model and input from the sensor signals;
determining, with a goal generator module, auxiliary goals and actuator goals;
the auxiliary goals based on engine states that are related to engine thrust during transient engine operations; and
the actuator goals based on positions for high pressure compressor stator vanes (HPCSV), low pressure compressor stator vanes (LPCSV) and/or engine stability bleeds (BLD);
electronically receiving information by a control module, being a hybrid model predictive control (HMPC), the received information including:
the exhaust nozzle position goal (A8 GOAL);
the sensor signals;
the synthesis signals (FN) signals; and
the auxiliary and actuator goals; and
determining and outputting, by the control module based on the received information, a control command for the gas turbine engine, the control command including:
a fuel flow (WF) command;
a stability bleeds (BLD) position command;
an exhaust nozzle position command;
a high pressure compressor stator vanes (HPCSV) position command; and
a low pressure compressor stator vanes (LPCSV) position command; and
controlling the gas turbine engine based on the control command.

13. The method of claim 12, further comprising:
controlling the gas turbine engine based on the control command by using at least an actuator, including controlling:
the fuel flow (WF);
the stability bleeds (BLD) position;
the exhaust nozzle position;
the high pressure compressor stator vanes (HPCSV) position; and
the low pressure compressor stator vanes (LPCSV) position.

14. The method of claim 13, further comprising determining an engine thrust goal (FN GOAL) based on, at least, a throttle level angle (TLA) command.

15. The method of claim 14, wherein the control command is further based on the engine thrust goal (FN GOAL).

16. The method of claim 13, wherein determining a nozzle schedule includes using one or more off-line simulations of a cycle of the gas turbine engine, and wherein the one or more off-line simulations of the gas turbine engine include at least one of a transient simulation based on a high-fidelity engine aero-thermal model or a steady-state simulation based on a high-fidelity engine aero-thermal model.

17. A gas turbine engine comprising:
a compressor section;
a combustor section downstream of the compressor section;
a turbine section downstream of the combustor section;
an exhaust nozzle, the exhaust nozzle changing positions to change dimensions of an exhaust section with respect to a tail cone; and
a control system comprising:
a nozzle scheduler for determining an exhaust nozzle position goal (A8 GOAL) based on a nozzle schedule of exhaust nozzle positions related to flight conditions;
a plurality of system sensors for determining sensor signals;
an engine model for estimating synthesis signals (FN) using the sensor signals;
a goal generator module for determining auxiliary goals and actuator goals;
the auxiliary goals based on engine states that are related to engine thrust during transient engine operations; and
the actuator goals based on positions for high pressure compressor stator vanes (HPCSV), low pressure compressor stator vanes (LPCSV) and/or engine stability bleeds (BLD);
a control module, being a hybrid model predictive control (HMPC), electronically receiving information, including:
the exhaust nozzle position goal (A8 GOAL);
the sensor signals;
the synthesis signals (FN); and
the auxiliary and actuator goals;
based on the received information, the control module determining and outputting a control command for the gas turbine engine, the control command including:
a fuel flow (WF) command;
a stability bleeds (BLD) position command;
an exhaust nozzle position command;
a high pressure compressor stator vanes (HPCSV) position command; and
a low pressure compressor stator vanes (LPCSV) position command.

18. The gas turbine engine of claim 17, comprising:
at least an actuator for controlling the gas turbine engine based on the control command, including controlling:
the fuel flow (WF);
the stability bleeds (BLD); position;
the exhaust nozzle position;
the high pressure compressor stator vanes (HPCSV) position; and
the low pressure compressor stator vanes (LPCSV) position.

19. The gas turbine engine of claim 18, wherein the control system further includes a command shaper for determining an engine thrust goal (FN GOAL) based on, at least, a throttle level angle (TLA) command.

20. The control system of claim 19, wherein the control command is further based on the engine thrust goal (FN GOAL).

* * * * *